United States Patent [19]
Lau et al.

[11] Patent Number: 5,111,620
[45] Date of Patent: May 12, 1992

[54] ENERGY ABSORBING MODULAR DOOR

[75] Inventors: Ian V. Lau, Troy; Jeffrey A. Welch, St. Clair Shores, both of Mich.

[73] Assignee: General Motors Corporation, Detroit, Mich.

[21] Appl. No.: 728,885

[22] Filed: Jul. 15, 1991

Related U.S. Application Data

[63] Continuation-in-part of Ser. No. 633,629, Dec. 24, 1990, Pat. No. 5,048,234.

[51] Int. Cl.⁵ .............................................. B60J 5/04
[52] U.S. Cl. ...................................... 49/502; 296/152; 296/189
[58] Field of Search ................... 49/502; 296/152, 189

[56] References Cited

U.S. PATENT DOCUMENTS

| | | | |
|---|---|---|---|
| 2,658,790 | 5/1953 | Fish et al. | 296/44 |
| 2,707,320 | 5/1955 | Fish | 29/152 |
| 4,272,103 | 6/1981 | Schmid et al. | 296/189 X |
| 4,428,157 | 1/1984 | Engelsberger | 49/502 |
| 4,474,391 | 10/1984 | Matsuno et al. | 296/189 X |
| 4,648,208 | 3/1987 | Baldamus et al. | 49/502 |
| 4,711,052 | 12/1987 | Maeda et al. | 49/502 |
| 4,783,114 | 11/1988 | Welch | 296/153 |
| 4,785,585 | 11/1988 | Grier et al. | 49/502 |

FOREIGN PATENT DOCUMENTS 1267116 5/1968 Fed. Rep. of Germany.

Primary Examiner—Philip C. Kannan
Attorney, Agent, or Firm—Charles E. Leahy

[57] ABSTRACT

A door inner panel and a door outer panel attached together in spaced apart relation defining a cavity. The door inner panel has a plurality of openings therein and the door components are individually mounted on the inner panel within these openings by a plurality of energy absorbing devices which are preferably comprised of convoluted straps.

3 Claims, 3 Drawing Sheets

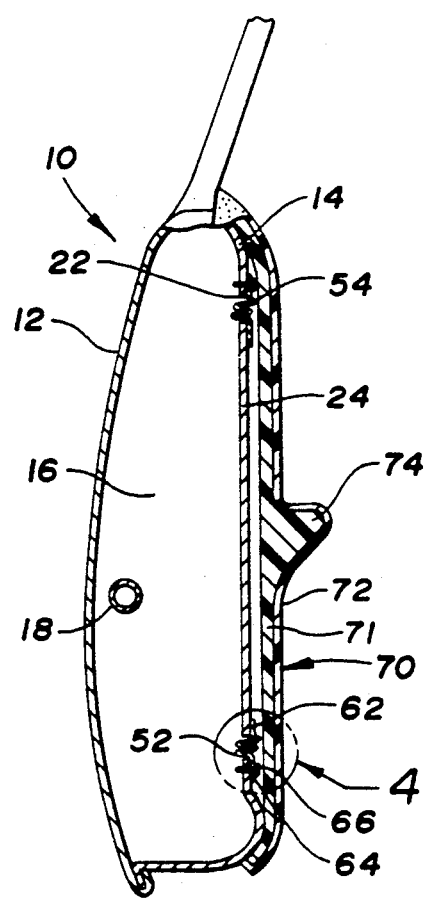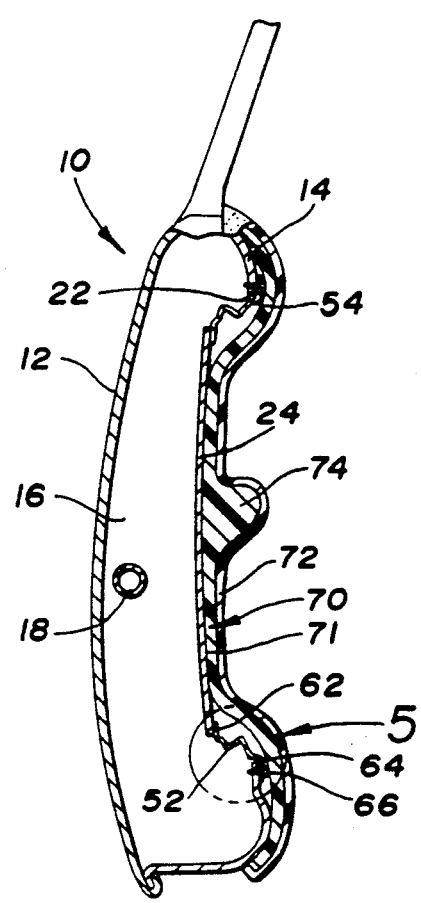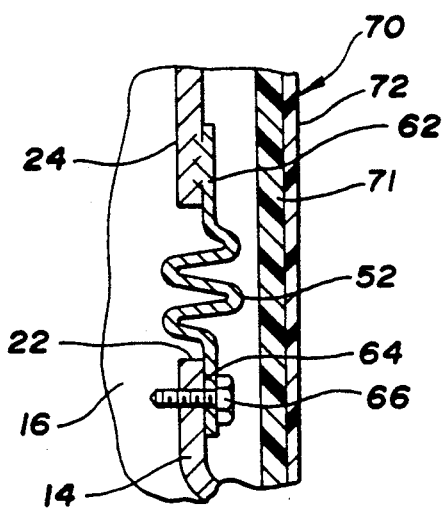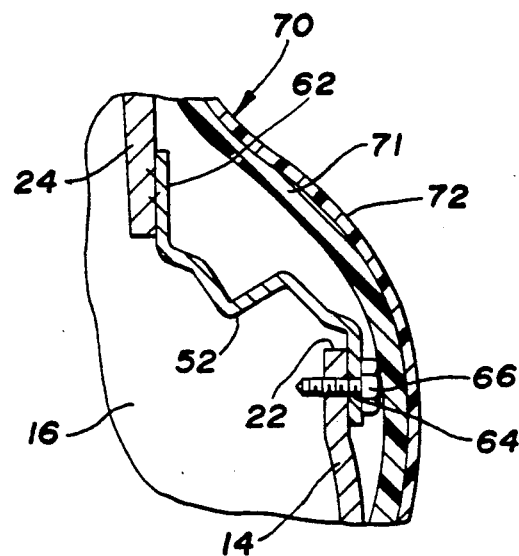

ENERGY ABSORBING MODULAR DOOR

This is a continuation-in-part of application Ser. No. 07/633,629 filed on Dec. 24, 1990, now U.S. Pat. No. 5,048,234.

The invention relates to a vehicle door having door operating components individually mounted on the door by a plurality of yieldable corrugated straps which absorb energy upon occupant impact against the door.

BACKGROUND OF THE INVENTION

It is well known to provide a vehicle door comprised of an outer panel and inner panel which are attached together in spaced apart relation defining a cavity in which door operating components such as window regulators, latches, handles, etc., are mounted. It is also well known to mount these door components on a module panel which is subsequently bolted to the door inner panel. In this way, the module panel with the door components may be produced and assembled at a location remote from the vehicle assembly plant and tested and inspected before assembly into the vehicle door.

The present invention relates to a new and improved vehicle door construction in which a plurality of yieldable energy absorbing devices are employed to attach a door component module panel on the vehicle door inner panel so that the module panel is permitted to move laterally relative the door upon energy absorbing yielding of the energy absorbing devices.

The present invention also relates to a new and improved vehicle door construction in which any one or more of the plurality of operating components of the door are mounted on the door panel by a yieldable energy absorbing device so that the operating components are permitted to move individually laterally relative to the door to absorb energy.

SUMMARY OF THE INVENTION

A vehicle door is comprised of a door inner panel and a door outer panel attached together in spaced apart relation defining a cavity. The door inner panel has an opening therein and the door components such as the window regulator and door handle are mounted on the module panel. A plurality of energy absorbing devices extend between the module panel and the door inner panel to effectively mount the module panel within the opening of the door inner panel. The energy absorbing devices yield upon the imposition of an occupant thereagainst to enable energy absorbing movement of the module panel and the door components into the cavity space between the inner and outer panels. The energy absorbing devices are preferably comprised of stamped steel straps having convolutions therein with one end of the strap welded to the module panel and the other end bolted to the door inner panel.

In a second embodiment the door inner panel has a plurality of openings therein and the door components are individually mounted on the inner panel within these openings by a plurality of energy absorbing devices which are preferably comprised of convoluted straps.

Accordingly, the object, feature and advantage of the invention resides in the mounting of a door module panel within an opening of the door inner panel via energy absorbing devices which enable energy absorbing movement of the module panel into the door cavity upon imposition of an occupant thereagainst.

A further object, feature and advantage of the invention resides in the provision of convoluted straps mounting a module panel on a vehicle door inner panel with the convolutions yielding upon imposition of an occupant force there against to absorb energy and permit the module panel and components to move into the cavity space between the door inner and door outer panels.

A still further object, feature and advantage of the invention resides in the individual mounting of vehicle door components within openings of the door panel by convoluted mounting straps so that the convolutions yield upon imposition of an occupant force against the door component to thereby permit the door component to move into the cavity space between the door inner and outer panels.

BRIEF DESCRIPTION OF THE DRAWINGS

These and other features, objects and advantages of the invention will become apparent upon consideration of the description of the preferred embodiment and the appended drawings in which:

FIG. 2 is a sectional view taken in the direction of arrows 2—2 of FIG. 1 and having parts broken away and in section to schematically show the energy absorbing module of this invention;

FIG. 3 is a view similar to FIG. 2 but showing the movement of the module panel into the space between the door inner and outer panels as permitted by the energy absorbing yielding of the convoluted straps;

FIG. 4 is a enlarged fragmentary view of FIG. 2 showing the convoluted energy absorbing straps;

FIG. 5 is a enlarged fragmentary view of FIG. 3 showing the deformed energy absorbing strap.

DESCRIPTION OF THE PREFERRED EMBODIMENT

Figure 1:
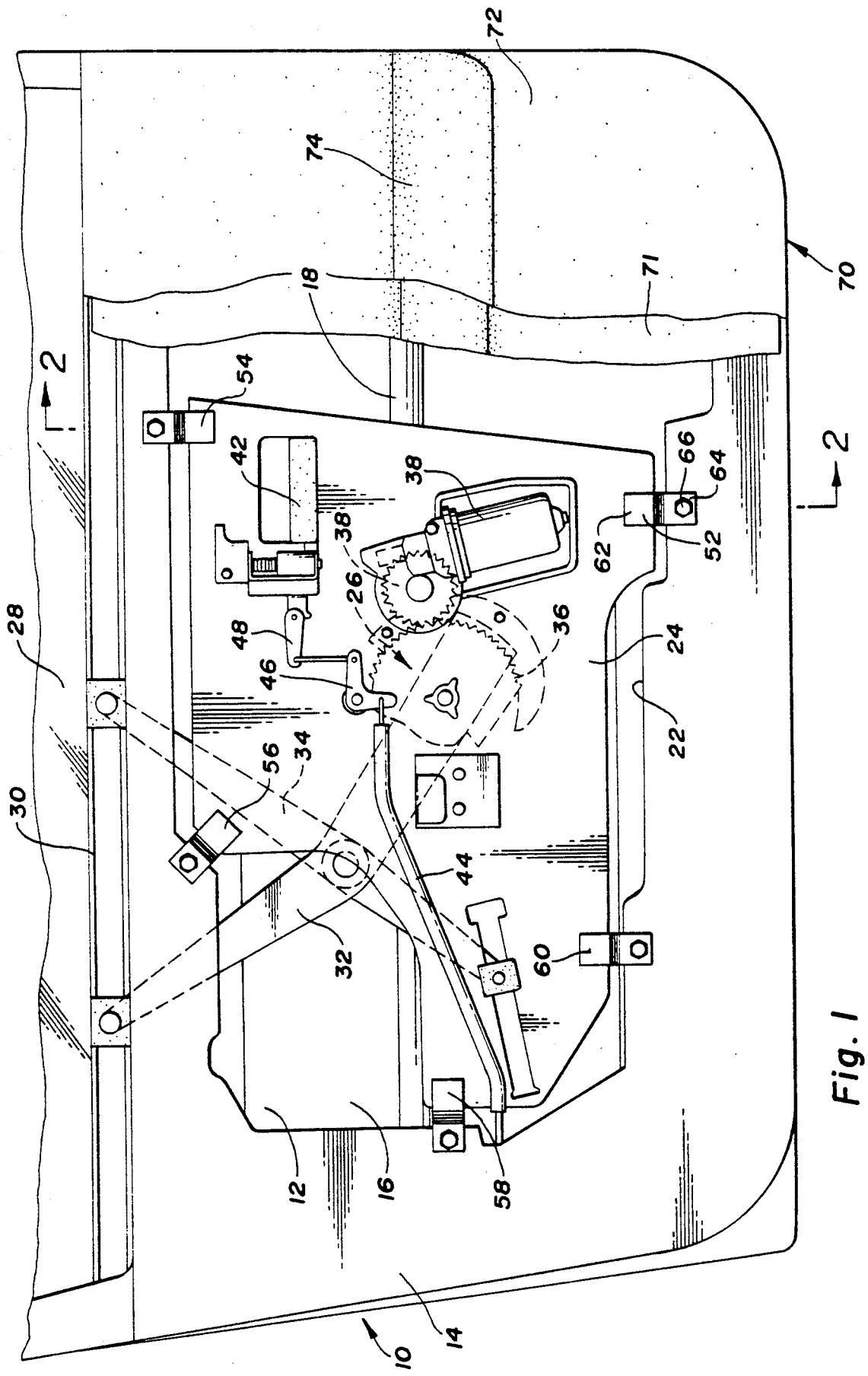
FIG. 1 a side elevation view of a vehicle door having parts broken away and in section to show the energy absorbing module of this invention.

Referring to FIGS. 1 and 2, it is seen that a vehicle door 10 is comprised of door outer panel 12 and a door inner panel 14 which are suitably joined together and spaced apart from one another to define a door cavity 16. An impact beam 18 comprised of a tube extends longitudinally within the door adjacent the outer panel 12.

As best seen in FIG. 1, the door inner panel 14 has a substantial opening 22 therein, in which a module panel 24 is mounted. The module panel 24 carries door components such as a window regulator assembly 26 which is connected to a window 28 by a sash channel 30 and regulator arms 32 and 34. A sector gear 36 carried by regulator arm 32 is driven by a motorized gear drive 38 to raise and lower the window 28. The module panel 24 also carries an inside door handle assembly 42 which is connected to a door latch, not shown, by control rod 44 and crank levers 46 and 48. The module panel 24 together with the door components mounted thereon comprise a modular door panel which is well known in the prior art and may be assembled and tested at a location remote from the vehicle assembly plant.

The module panel 24 is attached to the door inner panel 14 by a plurality of energy absorbing devices 52, 54, 56, 58, and 60. As best seen in FIG. 4, the energy absorbing device 52 is comprised of a metal strap having one end 62 thereof welded to the module panel 24 and the other end 64 thereof attached to the door inner panel 14 by a bolt 66. The energy absorbing devices 54, 56, 58 and 60 are similarly constructed.

Referring again to FIG. 1, it is seen that the energy absorbing straps 52, 54, 56, 58, and 60 are spaced around the module panel 24 to thereby provide substantially rigid connection of the module panel 24 to the door inner panel 14. As seen in FIGS. 1 and 2 a trim panel 70 is mounted on the inside of the door inner panel 14 and is constructed of a rigid molded plastic substrate panel 71 covered by a trim sheet 72 of cloth, vinyl or leather. A suitable arm rest structure 74 is suitably formed or mounted on the trim panel 70 or the module panel 24.

As best seen in FIGS. 3 and 5, the imposition of an occupant load of predetermined force against the door will cause the module panel 24 to move into the door cavity 16 as permitted by plastic yielding deformation of the corrugations of the energy absorbing straps.

It will be understood that the door can be readily designed to provide controlled energy absorbing movement of the module panel 24. For example, the location and number of energy absorbing straps can be varied, as well as the thickness, width, size and number of convolutions provided in the straps. In addition, the module panel 24 may be configured to be smaller in size than the opening 22 of the inner panel 14 as shown in FIG. 1, or alternatively the module panel 24 can have localized portions which overlap onto the module panel 24 so that the module panel 24 and/or the inner panel 14 will also yield to permit the passage of the module panel 24 into the door cavity 16.

Thus it is seen that the invention provides a new and improved vehicle door construction in which a module panel mounting door components is mounted on the door via energy absorbing devices by which the module panel may collapse into the cavity upon imposition of an occupant thereagainst.

DESCRIPTION OF A SECOND EMBODIMENT

Figure 6:
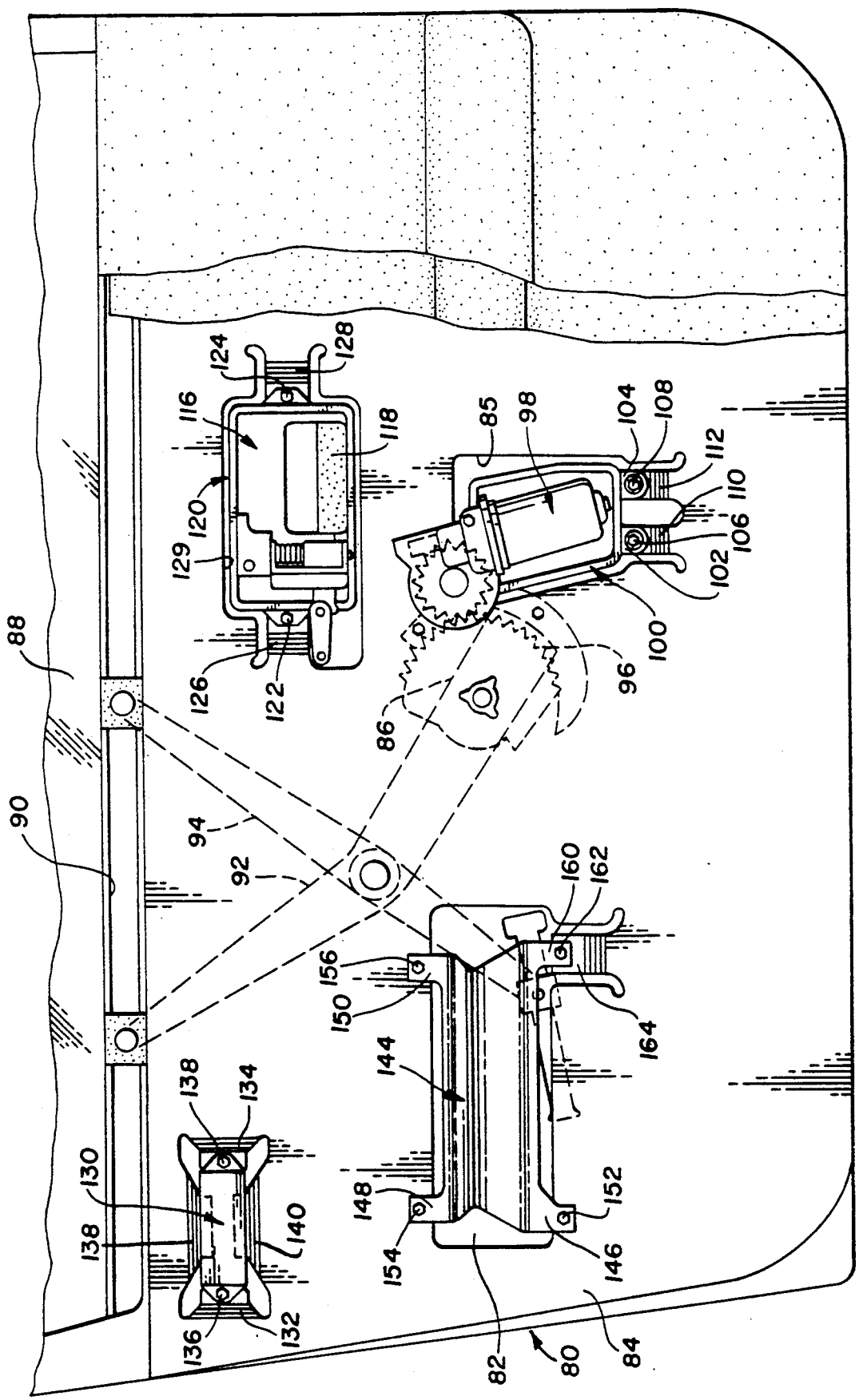
FIG. 6 is a side elevation view of a vehicle door having parts broken away and in section to show individual operating components of the door mounted on the door inner panel by energy absorbing devices.

Referring to FIG. 6 it is seen that a vehicle door 80 is comprised of a door outer panel 82 and a door inner panel 84 which are suitably joined together and spaced apart from one another to define a door cavity. A window regulator assembly 86 is mounted within an opening 85 on the inner panel 84 and is connected to a window 88 by a sash channel 90 and regulator arms 92 and 94. A sector gear 96 carried by the regulator arm 92 is driven by a motorized gear drive 98 to raise and lower the window 88. The motorized gear drive 98 includes a base 100 which carries a pair of mounting ears 102 and 104 which are connected by attaching bolts 106 and 108 to convoluted mounting straps 110 and 112 of the door inner panel 84. The mounting straps 110 and 112 are stamped integrally from the door inner panel 84 and have a convoluted cross section similar to that of the straps 52 shown in FIG. 4. The imposition of an occupant load of predetermined force against the motorized gear drive 38 will cause the motorized gear drive 98 to move into the door cavity as permitted by plastic yielding deformation of the corrugations of the energy absorbing straps 110 and 112.

Another operating component of the vehicle door is the inside door handle assembly 116 which includes handle 118 pivotally mounted on a base 120. The base 120 is attached by bolts 122 and 124 to convoluted mounting straps 126 and 128 stamped from the door inner panel 84. Accordingly the inside door handle assembly 116 is yieldably mounted within opening 129 of the door lower panel 84 so that imposition of an occupant load against the door handle assembly 116 will permit the door handle assembly to collapse into the cavity between the door inner and outer panels.

A seat belt retractor mounting plate 130 is mounted on the door inner panel 84 by a pair of convoluted mounting straps 132 and 134 connected to the mounting plate 130 by bolts 136 and 138. In addition convoluted support arms 138 and 140 are stamped integrally from the inner panel 84 and extend into underlying engagement with the retractor mounting plate 130. Accordingly, upon imposition of an occupant restraint load against the retractor, the base plate is permitted to yield into the cavity between the inner and outer panels by the plastic yielding deformation of the mounting straps 132 and 134 and the support arms 138 and 140.

An arm rest bracket is also mounted on the door inner panel 84. The arm rest bracket 144 is stamped from sheet metal and has mounting legs 146, 148 and 150 which are rigidly bolted to the inner panel by bolts 152, 154 and 156. In addition, the arm rest bracket 144 has a mounting leg 160 which is connected by bolt 162 to a convoluted mounting strap 164 stamped integrally from the inner panel 84. Accordingly upon imposition of an occupant restraint load against the arm rest, the corner of the arm rest bracket 144 attached by the convoluted strap 164 is permitted to yield and move into the cavity between the inner and outer door panels at a lower threshold of force than that which is required to bend the mounting legs 146, 148 and 150.

Thus it is seen that the invention also provides a new and improved vehicle door construction in which individual operating components of the vehicle door are individually mounted on the door inner panel by convoluted metal mounting straps which are plastically deformed upon imposition of an occupant restraint load to permit collapse of the door operating components into the cavity between the inner and outer door panels.

Although FIG. 6 shows the convoluted metal mounting straps to be integrally stamped from the inner panel, it will be apparent that these convoluted metal straps can be separately manufactured and then welded to the inner panel, or alternatively the convoluted straps may be formed integrally with the base plate of the door operating component.

The embodiments of the invention in which an exclusive property or privilege is claimed are defined as follows:

1. A vehicle door comprising:
   a door inner panel and door outer panel attached together to form a door hingedly mounted on the vehicle body, said inner panel having a plurality of openings therein, a plurality of door operating components adapted for mounting on the inner panel within the openings of the inner panel, and a plurality of energy absorbing means extending between the inner panel and the individual door operating components to individually mount the operating components on the door inner panel and enable energy absorbing movement of the operating components relative to the door upon impact of the occupant against the door.

2. A vehicle door comprising:
   a door inner panel and door outer panel attached together to form a door hingedly mounted on the vehicle body, said inner panel having a plurality of openings therein, a plurality of door operating components adapted for mounting on the inner panel within the openings of the inner panel, and a plurality of yieldable straps extending between the door inner panel and the individual operating component to effectively mount the operating component on the door, said yieldable straps yielding upon the imposition of a occupant there against to enable individual and independent energy absorbing movement of the door operating component into the space between the inner panel and the outer panel.

3. The combination of claim 2 further characterized by the plurality of yieldable straps being of one piece integral stamped construction with the door inner panel and being bolted to the door operating components.

* * * * *